(12) United States Patent
He et al.

(10) Patent No.: US 12,373,030 B2
(45) Date of Patent: Jul. 29, 2025

(54) OPTICAL SIGHTLINE TRACKING FOR A WEARABLE SYSTEM

(71) Applicant: Shenzhen Goodix Technology Co., Ltd., Shenzhen (CN)

(72) Inventors: Yi He, San Diego, CA (US); Bo Pi, San Diego, CA (US)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 456 days.

(21) Appl. No.: 17/988,707

(22) Filed: Nov. 16, 2022

(65) Prior Publication Data
US 2024/0160287 A1    May 16, 2024

(51) Int. Cl.
*G06F 3/01* (2006.01)

(52) U.S. Cl.
CPC ................... *G06F 3/015* (2013.01)

(58) Field of Classification Search
CPC ..................................... G06F 3/015
See application file for complete search history.

(56) References Cited

U.S. PATENT DOCUMENTS

| | | | |
|---|---|---|---|
| 11,048,327 B2 | 6/2021 | Yang et al. | |
| 11,428,955 B1* | 8/2022 | Lewis | G02C 7/083 |
| 2005/0175218 A1* | 8/2005 | Vertegaal | G06T 7/254 |
| | | | 345/157 |
| 2016/0026847 A1* | 1/2016 | Vugdelija | G06V 10/44 |
| | | | 382/103 |
| 2016/0070345 A1* | 3/2016 | Huang | G06F 3/0481 |
| | | | 351/246 |
| 2017/0220108 A1* | 8/2017 | Huang | G06F 3/013 |
| 2022/0129080 A1* | 4/2022 | Yasuda | G02B 27/0093 |

* cited by examiner

*Primary Examiner* — Gary Collins
(74) *Attorney, Agent, or Firm* — Kilpatrick Townsend & Stockton LLP

(57) ABSTRACT

Techniques are described for optical sightline tracking in a wearable system. Embodiments include a wearable structure that includes at least one integrated illuminator and at least one integrated imaging array. Each illuminator and imaging array is disposed in the periphery of an eye of a user wearing the structure. From the peripheral viewpoint, embodiments measure a three-dimensional origin point of one or both eyes and can compute angular coordinate measurements for one or both eyes based on the imaging to indicate the direction in which the user's eyes are looking (a sightline). Embodiments can track changes in the sightline to support various applications, such as positioning of display of virtual objects in virtual or augmented reality environments. Some embodiments can also use the obtained imagery for biometric verification and/or identification, detection of changes in pupillary response, etc.

20 Claims, 11 Drawing Sheets

OPTICAL SIGHTLINE TRACKING FOR A WEARABLE SYSTEM

TECHNICAL FIELD

This disclosure relates to eye tracking devices, and, more particularly, to portable, wearable, electronic devices for sightline tracking using self-registering optical techniques.

BACKGROUND

Eye sensor systems conventionally mount one or more cameras on or adjacent to a display or access control system and point the camera(s) in the direction of a user's eyes. Some such applications intend for the camera to be placed very close to the eye during use, such as for retinal scanning for biometric identification and/or verification applications. Other such applications intend for the camera to be farther from the user's eyes, such as for monitoring how a user's gaze tracks during a reading exercise, what draws the user's focus during presentation of an advertisement, what causes changes in pupil response for biofeedback, or the like.

These conventional eye sensor systems typically provide their own frame of reference. For example, in conventional biometric access control applications, one or more images of the eye are obtained, key features are identified within the image, and those features are compared with features in a database. The feature comparison may involve several types of image transformations, or the like, but each image nonetheless provides its own frame of reference. Similarly, in the gaze tracking applications, each camera is fixed in a known (e.g., pre-calibrated) location and orientation relative to the display, such that any image capture by the camera has a known and fixed position and orientation offset relative to images displayed on the display.

However, such conventional approaches do not tend to work in context of changing relative frames of reference. For example, in an augmented reality (AR) environment, a user can wear a headset having integrated displays through which the user can see real-world objects in the surrounding environment. The AR system may attempt to display virtual images on the integrated displays in such a way that appear to the user as if the virtual objects are projected into the real-world environment in particular locations based on where the user is looking. In such a case, accurate positioning of the virtual objects on the integrated displays can involve tracking locations on the integrated displays relative to a real-world frame of reference, tracking locations on the integrated displays relative to the locations of the user's eyes, and tracking locations on the integrated displays relative to the direction in which the user is looking; and all of those parameters may be constantly changing.

SUMMARY

Embodiments provide systems and methods for optical sightline tracking in a wearable system. Embodiments include a wearable structure, such as a headset, visor, eyeglass frames, etc. that has, integrated therein, at least one illuminator and at least one imaging array. Each illuminator and imaging array is disposed in the periphery of an eye of a user wearing the structure (e.g., peripherally to the side of the eye, near the temple; peripherally to the bottom of the eye, near the top of the cheek; etc.). From the peripheral viewpoint, embodiments measure a three-dimensional origin point of one or both eyes. For example, a vertex of corneal surface curvature can be used as the 3D origin point. Embodiments can then compute angular coordinate measurements for one or both eyes based on the imaging to indicate the direction in which the user's eyes are looking (a sightline). Embodiments can track changes in the sightline and can use the sightline to support various applications, such as positioning of display of virtual objects in a virtual or augmented reality environment. Some embodiments can also use the obtained imagery for biometric verification, biometric identification, detection of changes in pupillary response (e.g., to indicate a change in mood, surprise, change in ambient lighting, etc.).

According to one set of embodiments, a system is provided for optical sightline tracking. The system includes: a wearable structure configured to be worn on a user's head; a first illuminator integrated with the wearable structure at a first temporal side of a first eye of the user to project illumination across a first cornea of the first eye; a first imaging array integrated with the wearable structure at the first temporal side to generate first imagery of the first eye; and a control processor. The control processor is to: compute a first three-dimensional (3D) origin point of the first eye based at least on detecting a first vertex of curvature of a first corneal surface of the first eye in the first imagery; compute a first angular coordinate measurement of the first eye based on detecting a first set of pupil dimensions in the first imagery and computing an offset between the first set of pupil dimensions and a pupil dimensional reference; and compute a sightline based on the first 3D origin point and the first angular coordinate measurement.

According to another set of embodiments, a method is provided for optical sightline tracking. The method includes: projecting first illumination, by a first illuminator of a wearable structure located at a first temporal side of a first eye of a user wearing the wearable structure, the first illumination projected across a first cornea of the first eye; generating first imagery of the first eye, under the first illumination, by a first imaging array of the wearable structure located at the first temporal side; computing, by a control processor of the wearable structure, a first three-dimensional (3D) origin point of the first eye based at least on detecting a first vertex of curvature of a first corneal surface of the first eye in the first imagery; computing, by the control processor, a first angular coordinate measurement of the first eye based on detecting a first set of pupil dimensions in the first imagery and computing an offset between the first set of pupil dimensions and a pupil dimensional reference; and computing, by the control processor, a sightline based on the first 3D origin point and the first angular coordinate measurement.

BRIEF DESCRIPTION OF THE DRAWINGS

The accompanying drawings, referred to herein and constituting a part hereof, illustrate embodiments of the disclosure. The drawings together with the description serve to explain the principles of the invention.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

Embodiments described herein use a wearable device to perform sightline tracking. The wearable device includes a wearable frame that positions one or more illuminators and one or more imaging arrays at peripheral locations around one or both of a user's eyes. Each illuminator projects illumination across the cornea of one of the eyes from a very large angle, and each imaging array images one of the eyes from a very large angle (e.g., from substantially the same, or a different location around the eye periphery). The imaging is used to obtain a three-dimensional (3D) origin point as a coordinate reference for at least one of the eyes, and to obtain an angular measurement representing a direction is which the pupil is looking. The sightline can be computed by projecting the 3D origin point and the angular measurement into the 3D space of the wearable frame.

Figure 1:
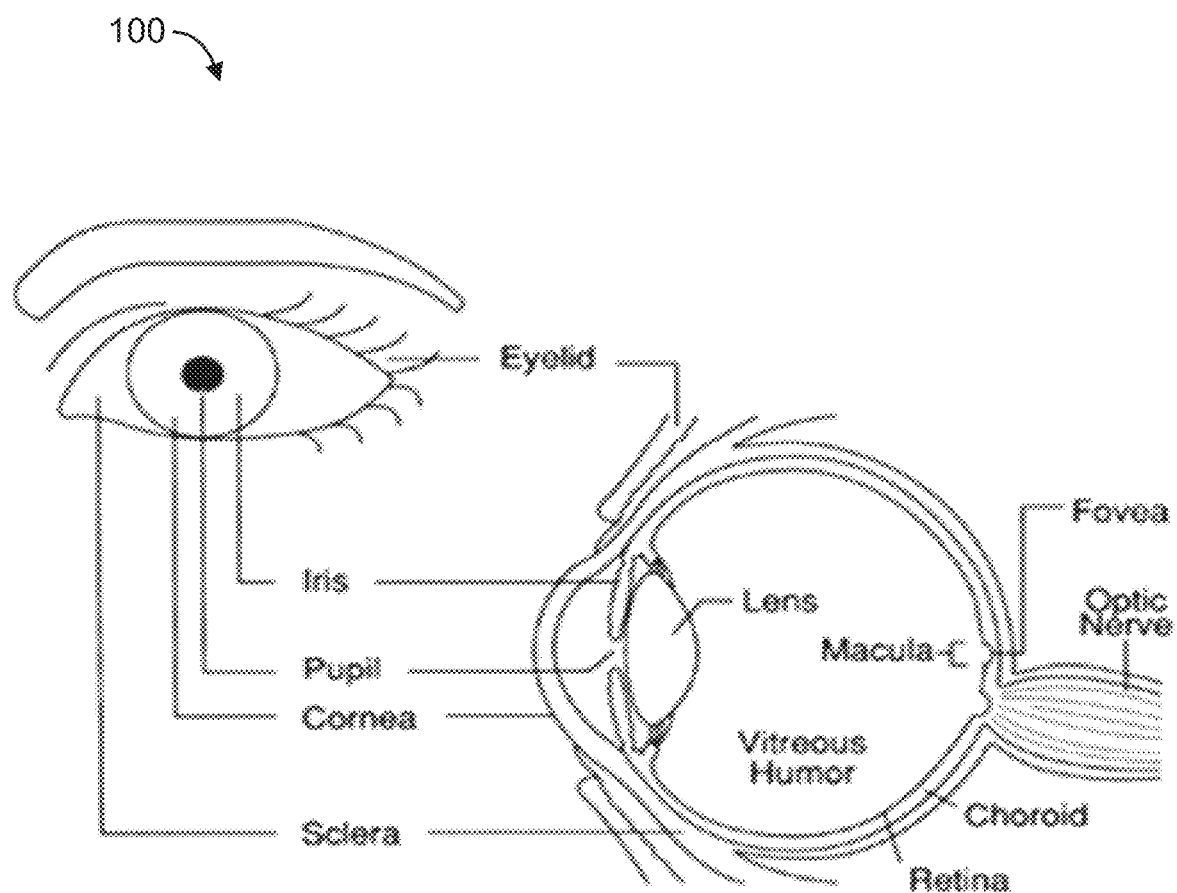
FIG. 1 shows a diagram of the anatomy of a human eye as context for embodiments described herein.

FIG. 1 shows a diagram 100 of the anatomy of a human eye as context for embodiments described herein. The outer wall of the eye includes three concentric layers. The outer layer includes the cornea, which is a transparent structure that covers the iris. A second layer includes the lens, which functions as the focusing system of the eye. A third layer includes the sclera, which is an opaque structure forming a fibrous, protective, outer layer of the eye containing collagen and elastic fiber, also referred to as the "white of the eye." The iris is a thin, circular structure in the eye containing pigment. The iris determines one's eye color and controls the diameter and size of the pupil.

The pupil is an adjustable opening at the center of the iris that allows varying amounts of light to enter the eye through the lens. The lens is a transparent, biconvex structure that can refract light to focus it on the retina. The retina is a layered structure in the back of the eye with several layers of neurons (photoreceptor cells) interconnected by synapses to receive the focused light as an image and to transduce the image into electro-chemical neurological signals. The photoreceptor cells of the retina include cones (typically about 6% of the photoreceptor cells) and rods (typically about 94% of the photoreceptor cells), which are located mainly along the peripheral of the retina. Cones are concentrated in the center region of the retina, known as the fovea. The macula is an oval-shaped highly pigmented yellow spot near the center of the retina and containing the fovea, parafovea, and perifovea. The fovea is a small pit that contains the largest concentration of cone cells in the eye and is responsible for central, high-resolution vision. The choroid is a region of the eye rich in blood vessels that supplies the outer layers of the retina. The eye also includes fluids such as the aqueous humor located in the front region between the cornea and the iris and the vitreous humor located in the rear region behind the lens.

Figure 2:
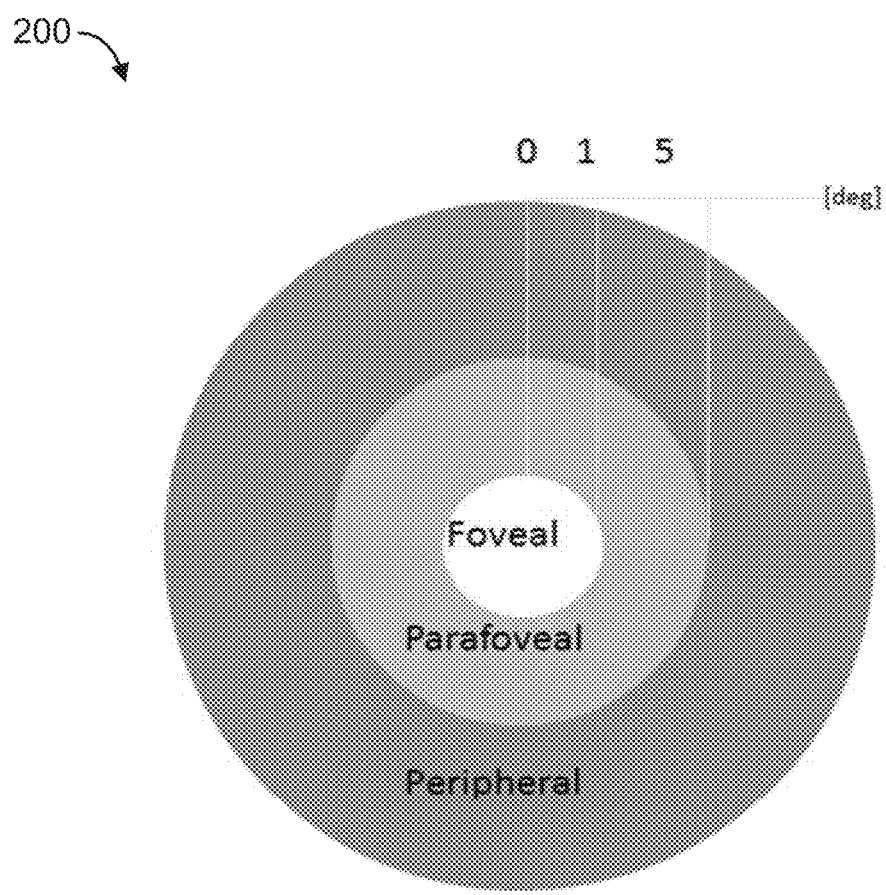
FIG. 2 shows a diagram of a typical human vision field as further context for embodiments described herein.

FIG. 2 shows a diagram of a typical human vision field 200 as further context for embodiments described herein. The vision field 200 is generally divided in to three regions: the fovea, parafovea, and peripheral vision regions. The fovea region provides the sharpest vision, the parafovea region previews foveal information, and the peripheral vision reacts to flashing objects and sudden movements. For example, peripheral vision includes approximately 15-50% of the acuity of the fovea and it is also less color-sensitive. As shown in FIG. 2, each region of the vision field 200 is associated with an exemplary degree of the visual field 200 that the region can see. In the human eye, the three regions of the vision field 200 are typically asymmetric. For example, when reading, the so-called perceptual span (e.g., size of the effective vision) is 3-4 letter spaces (e.g., approximately one degree of visual angle) to the left of fixation and 14-15 letter spaces to the right.

Visual fixation is when the eye maintains a gaze on a single location. In fixation, the eye is relatively still and "fixated" to the certain point, such as when reading a single word. In vision, information from the scene is mainly acquired during fixation. However, the duration of fixation tends to vary between only 120-1000 milliseconds (ms), and typically only between 200-600 ms; a typical fixation frequency is less than 3 Hertz (Hz). Instead, eyes are typically in constant motion (except for the very short fixation durations), even during sleep. There are several different types of eye movements, including pursuit, tremor, rotation, drift, and saccades. In humans, the eyes tend to move around while looking at a scene, rather than maintaining a fixed steadiness, locating parts of interest of the scene to mentally create a three-dimensional map corresponding to the scene.

For example, when scanning a scene or while reading words on a page, the eyes make jerky saccadic movements and stop several times, moving very quickly between each stop.

A saccade is a fast movement or "jump" of an eye, which connect fixations. Saccades can be quick, simultaneous movements of both eyes in the same direction. Saccades occur rapidly (e.g., with durations of 40-120 ms), move quickly (e.g., up to 600 degrees per second), and are ballistic, in which the end point of saccade cannot be changed during the movement. The saccadic movements of the human eye may be due to the role of the in resolving objects detected in vision. For example, moving the eye can facilitate sensing small parts of a scene with greater resolution using the visual processing functionality of the nervous system more efficiently.

Figure 3:
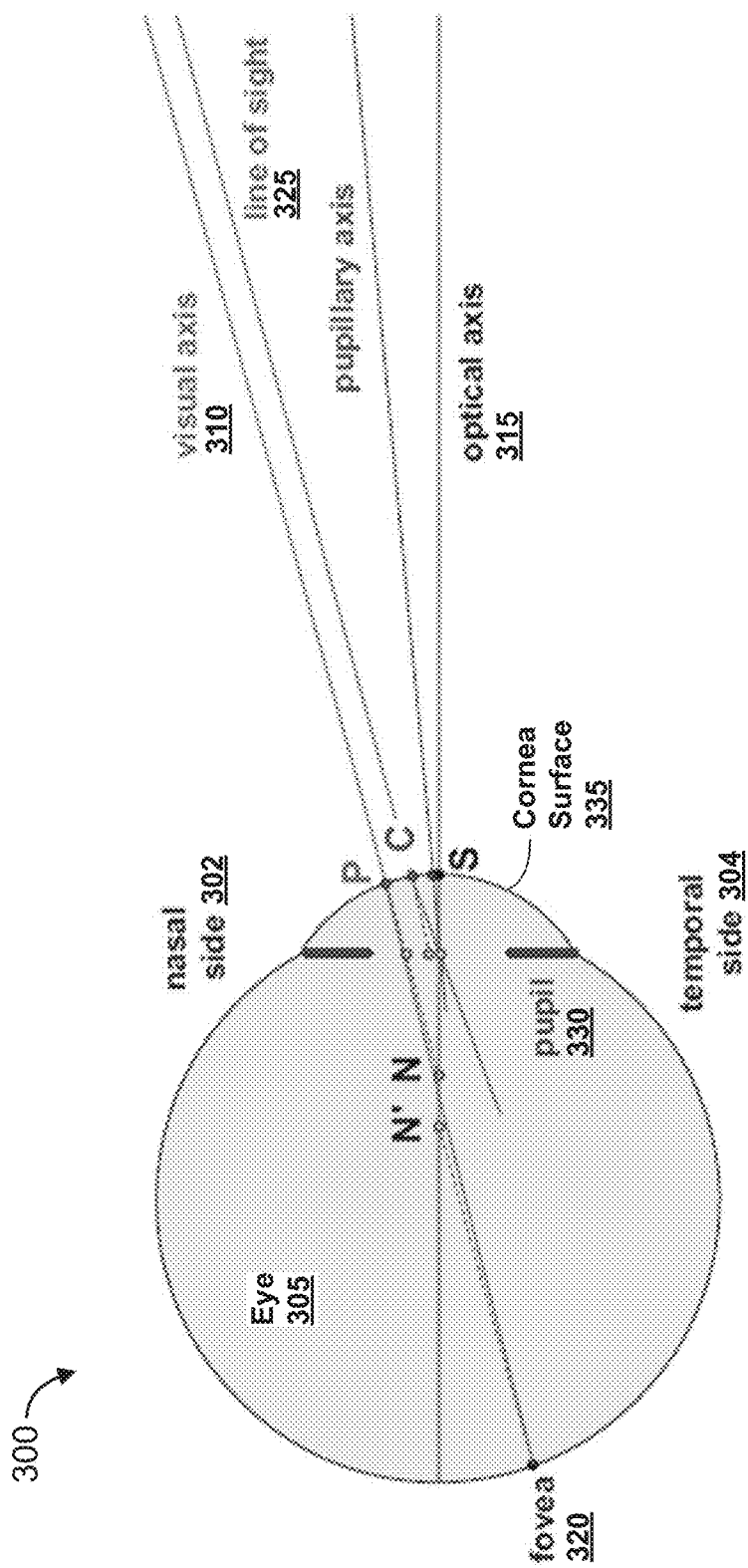
FIG. 3 shows a diagram of various optical axes of a human eye as further context for embodiments described herein.

FIG. 3 shows a diagram 300 of various optical axes of a human eye 305 as further context for embodiments described herein. The diagram 300 is oriented looking from the top at a right eye 305, such that the eye 305 is facing toward the right on the page, the nasal (toward the nose) side 302 of the eye 305 is upward on the page, and the temporal (toward the temple) side 304 of the eye 305 is downward on the page. As illustrated, the human eye's 305 visual axis 310 differs from the optical axis 315 because the fovea 320 is generally not located on the optical axis 315. Typically, there is a 3- to 8-degree angle between the line of sight 325 (parallel to the visual axis 310) and the optical axis 315, while the fovea 320 covers approximately a 5-degree view angle. Furthermore, the center of the entrance pupil 330 is actually shifted toward the nasal side 302 because of the asymmetric structure of the human eye 305 vision system. On the cornea surface 335, point 'C' and point 'S' can have a distance typically of about 0.2-0.55 millimeters.

Figure 4:
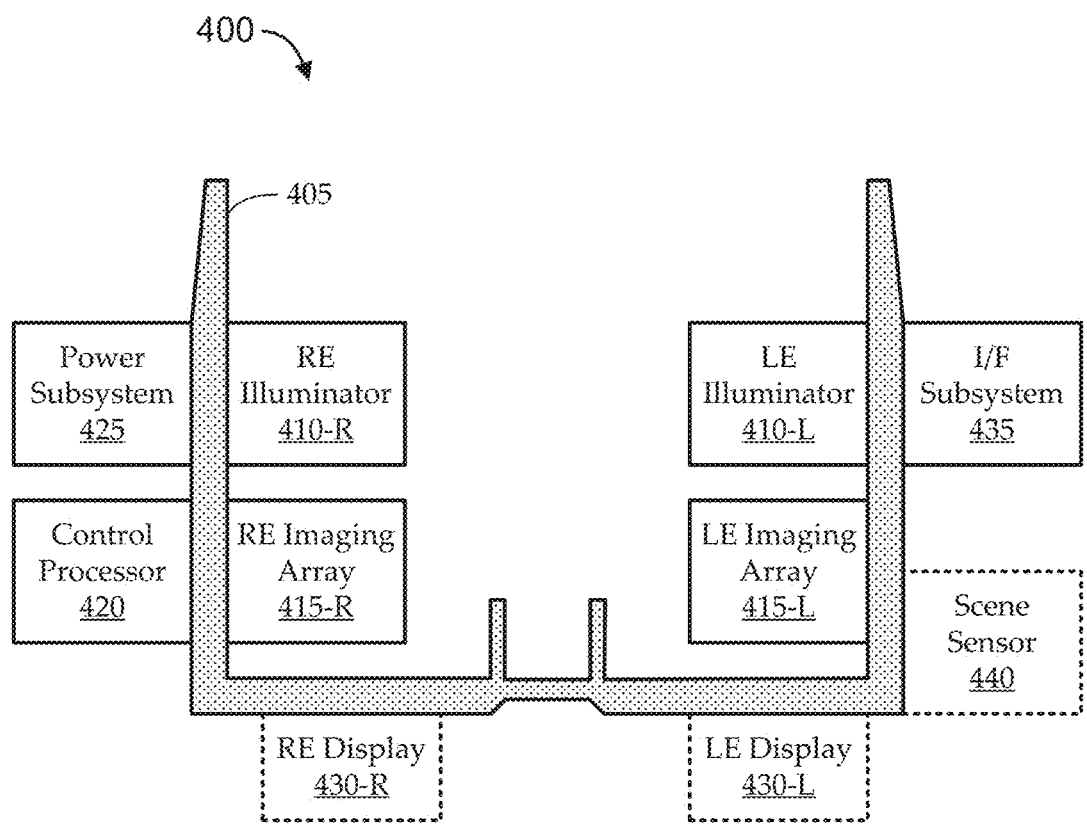
FIG. 4 shows an illustrative wearable system for optical sightline tracking, according to embodiments described herein.

FIG. 4 shows an illustrative wearable system 400 for optical sightline tracking, according to embodiments described herein. The system 400 includes a wearable structure 405 for wearing on a user's head. The wearable system 400 includes various sightline tracking components, including one or more illuminators 410, one or more imaging arrays 415, and a control processor 420. Some embodiments further include a power subsystem 425, one or more displays 430, an interface subsystem 435, and/or a scene sensor 440. At least the illuminators 410 and the imaging arrays 415 are physically integrated with the wearable structure 405. Some or all of the other sightline tracking components can also be physically integrated with the wearable structure 405. In one implementation, all of the sightline tracking components are integrated with the wearable structure 405. In another implementation, the illuminators 410, imaging arrays 415, and a scene sensor 440 are fully physically integrated with the wearable structure 405, along with portions of the control processor 420, power subsystem 425, interface subsystem 435; the wearable structure 405 is in communication (e.g., via portions of the interface subsystem 435) with one or more separate computational systems; and the one or more separate computational systems implement additional portions of the interface subsystem 435, the control processor 420, and/or the power subsystem 425.

In some embodiments, the wearable structure 405 is a unitary structure, such that all components of the wearable structure 405 are physically coupled (e.g., into an assembly). For example, the wearable structure 405 is in the form of complete or partial eyeglass frames. In some embodiments, the wearable structure 405 includes one or more physical components configured to mount to another wearable structure. For example, the wearable structure 405 includes temple pieces, each configured to mount to a temple of an eyeglass frame (e.g., by clipping on, by friction fit, or in any suitable manner), and the wearable structure 405 includes nose piece targets, each configured to be coupled to a nose pad of the eyeglass frame (e.g., by clipping on, by adhesive, or in any suitable manner).

Figures 5A, 5B:
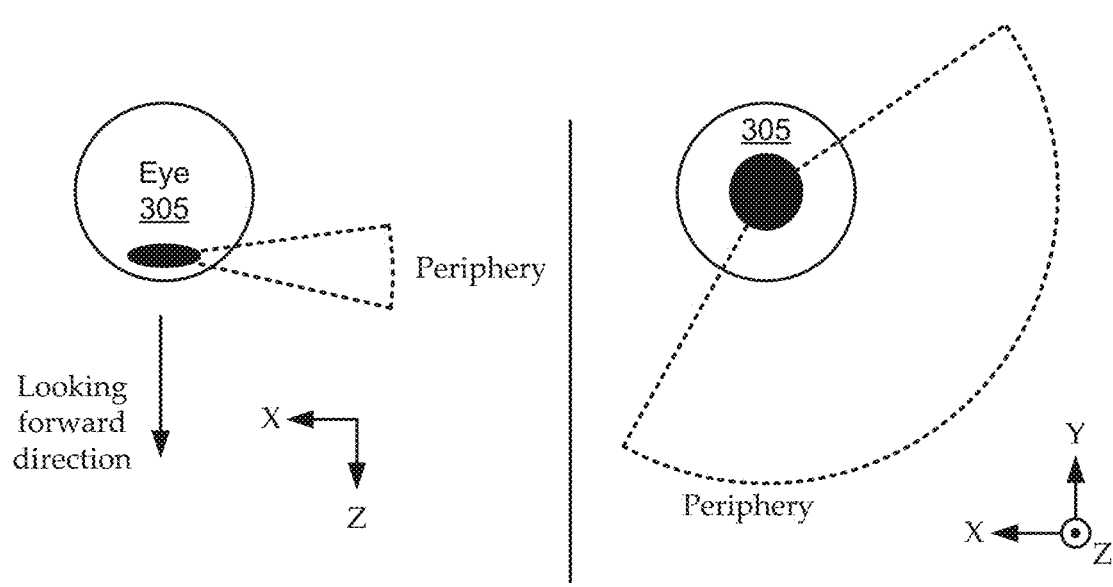
FIGS. 5A and 5B illustrate a directional convention used herein, along with illustrative peripheries.

The illustrated system 400 includes at least one illuminator 410 and at least one imaging array 415 positioned at the periphery of one or both eyes of the user when the user is wearing the wearable structure 405. The term "periphery," is used herein to refer to locations around the outside of the eye at large angles to the eye, such as to the temporal side of the eye, above the eye, and/or below the eye. For example, FIGS. 5A and 5B illustrate a directional convention used herein. The illustrated convention assumed a default position in which the user is wearing the wearable structure 405 and his head is oriented to look straight ahead. In this position, the y-axis for each eye is generally the vertical axis pointing from the ground to the top of the user's head, the x-axis for each eye is generally the horizontal axis vertical axis pointing from the temporal side of the eye toward the nasal side of the eye, and the z-axis is generally the look-ahead axis pointing straight ahead from the user's eyes.

FIG. 5A shows a top-down view of an eye 305 oriented so that the z-direction points downward and the positive x-direction points to the left (e.g., this is a left eye). An example portion of the periphery is illustrated as a region to the temporal side of the eye and at a large angle relative to the z-axis direction. In some implementations, the periphery is a spherical crescent region of approximately 70-110 degrees rotated to either side of the straight-ahead z-direction. FIG. 5B shows a front view of an eye 305 oriented so that the positive z-direction points out of the page, the positive x-direction points to the left, and the positive y-direction points upward. A portion of the periphery is illustrated as a cut plane through the spherical crescent region of FIG. 5A. The cut plane illustrates that the periphery, as used herein, can include a region to the temporal side periphery of the eye, a region to the underside periphery of the eye, and/or a region fully surrounding (i.e., 360 degrees around) the periphery of the eye (all at a large angle relative to the z-axis direction, such as close to an x-y plane). Embodiments described herein typically utilize portions of the periphery toward the temporal and/or lower sides of each eye (e.g., to the negative-x and/or negative-y directions).

Returning to FIG. 4, the conventional directions described in FIGS. 5A and 5B can be considered as forming a reference coordinate system that is effectively the coordinate system of the wearable structure 405. The wearable system 400 generally operates to image and measure features of one or both of the user's eyes so as to compute a present sightline registered to the reference coordinate system. Computing the present sightline involves at least two aspects. First, the wearable system 400 computes a 3D origin point of each eye in the reference coordinate system. The 3D origin point can represent the center of the eyeball, or any other trackable location, or location computable therefrom. Second, the wearable system 400 computes an angular measurement representing a direction is which the pupil of the eye is looking. The sightline can be computed by projecting the 3D origin points and the angular measurements of one or both eyes as registered to the reference coordinate system.

Imaging the eyes involves illuminating each eye by a respective one of the illuminators 410. Given the position of each illuminator 410 at a respective eye periphery, the illuminator 410 projects illumination across the corneal surface of the eye. The large illumination angle can appreciably reduce the amount of illumination power reaching the user's retina. Further, embodiments of the illuminators 410 project illumination in an eye-safe frequency band, such as in the infrared band. For example, the infrared band can be selected so that the user will not see the illumination and imaging based on the illumination will not be adversely impacted by ambient light.

Each imaging array 415 can then image a respective eye based on received portions of the illumination. Each imaging array 415 is an array of imaging elements implemented in a small form factor. In one implementation, each imaging array 415 is a micro-camera. In another implementation, each imaging array 415 is a charge-coupled device (CCD) array. Preferably, the imaging arrays 415 are implemented without moving parts, such as without use of scanning mirrors, or the like. Further, because the imaging arrays 415 are implemented in a substantially predictable imaging environment (e.g., a substantially predictable distance from the target features to be imaged), the imaging array 415 can be implemented without autofocusing optics, and the like. However, some implementations can exploit focusing and/or other optical techniques to achieve additional features, such as to support multispectral imaging, distance estimation (e.g., by time-of-flight, or other techniques), etc. Embodiments of the imaging arrays 415 include filters (e.g., bandpass filters in the receiving optics) to enhance imaging.

At the large angle of illumination and imaging, various eye features can be detected. In general, at the large angle of illumination, the cornea and the retina both tend to reflect illumination away from the sensors. As such, the surface tissues of the eye appears in the imagery obtained by the imaging array 415 as relatively bright and the pupil appears in the imagery obtained by the imaging array 415 as an obviously dark (highly contrasted) region. Different embodiments can use the pupil image in different ways as described herein, such as to support computation of an angular measurement of the present sightline. Some implementations further use dynamic changes in pupil size (e.g., pupil dilation response) to monitor a user's emotional state. At the large illumination angle, the iris and sclera tend to produce sufficient scattering of the illumination so that they can be clearly imaged by the imaging arrays 415. Some implementations can use distinguishing signatures of iris and/or distributions of vessels on the sclera for biometric validation and/or verification of users. Also, at the large imaging angle, the curvature of the corneal surface can be detected and measured, such as to compute a vertex of the curvature, a radius of the curvature, and/or other features. Embodiments described herein can use the corneal surface measurements to support computation of the 3D origin point, and/or other features.

The control processor 420 is communicatively coupled with (e.g., by direct electrical connection, or in any other suitable manner) the illuminators 410 and imaging arrays 415. Embodiments of the control processor 420 perform image processing, feature recognition, computations, tracking, and other features to implement sightline tracking. In some implementations, the control processor 420 also directs and controls projection of illumination by the illuminator 410, and/or directs and controls obtaining of imagery by the imaging array 415. The control processor 420 can be implemented in any suitable manner. Embodiments of the control processor 420 can include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction set computer (RISC) processor, a complex instruction set computer (CISC) processor, a microprocessor, or the like, or any combination thereof. Though not explicitly shown, embodiments of the control processor 420 are in communication with one or more memory components, such as a non-transient storage for providing processor-readable instructions to the control processor 420 and for storing various types of data to support features described herein.

The control processor 420, the illuminators 410, the imaging arrays 415, and/or other sightline tracking components can be powered by the power subsystem 425. Embodiments of the power subsystem 425 include any suitable power source. In some implementations, the power subsystem 425 includes an on-board power source, such as a rechargeable battery integrated with the wearable structure 405. In other implementations, some or all power is received by the power subsystem 425 by an external power supply, a wireless (e.g., inductive) charging interface, or the like.

Some embodiments of the wearable system 400 include the interface subsystem 435. Some embodiments of the interface subsystem 435 include user interface components, such as one or more button interfaces, touchscreen interfaces, switch interfaces, etc. Additionally or alternatively, embodiments of the interface subsystem 435 include computational interface components, such as wired and/or wireless ports for interfacing with other computational systems (e.g., a smartphone, a laptop computer, a server computer, a monitor or television, etc.), data and/or communication networks, etc.

Some embodiments of the wearable system 400 include one or more integrated displays 430. For example, the wearable structure 405 can be implemented as eyeglasses, an augmented reality (AR) visor, a virtual reality (VR) helmet, or the like, such that the wearable structure 405 includes components in front of each eye that can display imagery to the user. In one implementation, a single display 430 (or each of multiple displays) outputs monocular image information. For example, at any particular time a single image is being output to one or both eyes of the user via one or more displays 430. In another implementation, multiple displays are used to output binocular, or stereoscopic image information. For example, at any particular time multiple (e.g., left and right) images are concurrently being output to both eyes of the user via one or more displays 430.

Embodiments of the wearable system 400 can include components to support additional input and/or output modalities, instead of or addition to the displays 430. For example, although not explicitly shown in FIG. 4, embodiments of the wearable structure 405 can integrate one or more audio transducers (e.g., one or more speakers for audio output; one or more microphones for audio input, active noise cancellation, etc.), one or more haptic components, etc. In some embodiments, components providing such additional interface modalities can be part of the interface subsystem 435. For example, video, audio, and/or haptic components can be used to recognize input commands, such as gestures, voice commands, etc.

As described above, the various sightline tracking components operate to compute and track a present sightline within the reference coordinate system of the wearable structure 405. Such tracking provides support for various types of application environments. In some application environments, the sightline tracking is used to support display of information on one or more local displays 430, such as for VR or heads-up display (HUD) applications. For example, as described with reference to FIGS. 1-3, the present direction of the user's sightline defines the present locations of the user's visual field 200 regions (e.g., the foveal and parafoveal regions), thereby defining which portions of a virtual scene a user's visual system will process at higher fidelity. Thus, rendering approaches can be optimized by focusing rendering resources on displaying only those objects in a scene that are within a user's present visual field 200, by increasing the resolution for only those virtual objects within the foveal region, etc.

In other application environments, the reference coordinate system of the wearable structure 405 is further registered to a world or scene coordinate system, so that the sightline tracking can be placed in a visual context external to the wearable structure 405. To support such application environments, some embodiments of the wearable system 400 include the scene sensor 440. The scene sensor 440 can include any suitable components for facilitating registration of the reference coordinate system of the wearable structure 405 to an external coordinate system. For example, the scene sensor 440 can include one or more video systems to capture and process imagery of the environment external to the wearable system 400; one or more accelerometer, gyroscopic, and/or other components to track local position, movement, orientation, and/or other information; one or more trackable targets, such as visual targets, antennas, or the like, to facilitate tracking of position and/or orientation of the wearable system 400 by an external system; etc.

As one example of such an application environment, in an AR environment, the user sees the real world through a transparent display (e.g., integrated with a headset), and the AR system projects virtual objects and/or scenery onto the display in a manner that appears to augment the real world (i.e., the virtual imagery is overlaid onto the real world). Doing so typically involves registering the projected virtual objects to real-world coordinates. In such application environments, using the scene sensor 440 to register the sightline tracking of the wearable system 400 to real-world coordinates facilitates use of sightline tracking for enhanced AR features. For example, an enhanced AR system may use such sightline tracking to detect that a user is looking at a particular object in the real world and may project information about that object to the user via the AR display.

Another example of such an application environment is one in which sightline tracking is used with respect to one or more external displays that are separate from the wearable system 400. For example, a user is wearing the wearable system 400 and is looking at video displayed on a television or computer monitor. In such application environments, using the scene sensor 440 to register the sightline tracking of the wearable system 400 to a coordinate system of the external display or displays facilitates use of sightline tracking to determine where a user is looking relative to the external display (e.g., which elements of the displayed video are capturing the user's attention).

Figure 6:
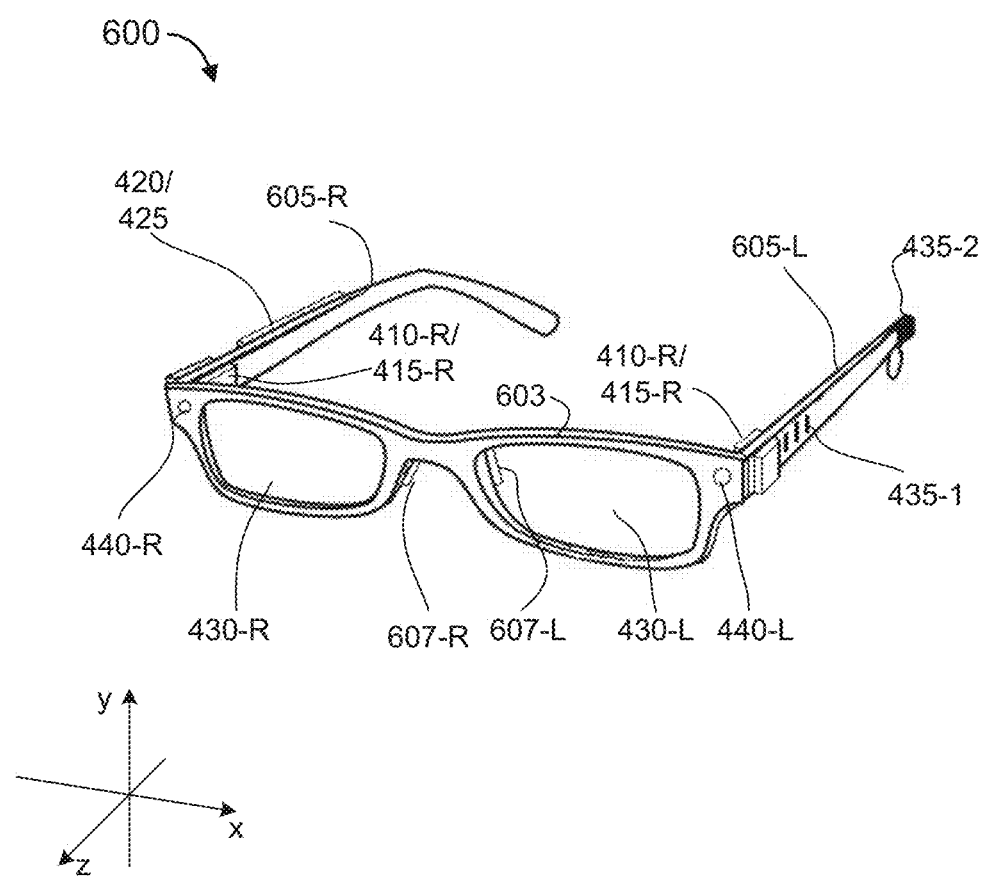
FIG. 6 shows an illustrative wearable system based on side-view imaging, according to some embodiments described herein.

The wearable system 400 of FIG. 4 can be implemented in several ways. FIG. 6 shows an illustrative wearable system 600, according to a first set of embodiments. The wearable system 600 can be an implementation of the wearable system 400 of FIG. 4. The same coordinate axis convention presented in FIGS. 5A and 5B is shown in context of the wearable system 600 for added clarity. In the illustrated embodiment, the wearable structure is implemented as an eyeglass frame. The eyeglass frame includes a rim portion 603, temple portions 605, and nose portions 607.

The right temple portion 605-R is illustrated as having, structurally integrated therewith, the control processor 420 and power subsystem 425, a right-eye illuminator 410-R, and a right-eye imaging array 415-R. The left temple portion 605-L is illustrated as having, structurally integrated therewith, the interface subsystem 435 (including a set of user interface controls 435-1 and one or more ports or other computational interfaces 435-2), a left-eye illuminator 410-L, and a left-eye imaging array 415-L. The rim portion 603 is illustrated as having, structurally integrated therewith, right and left displays 430 and right and left scene sensors 440.

Although a particular configuration is shown, sightline tracking components can be structurally integrated in any suitable manner. For example, while the illuminators 410 and imaging arrays 415 are illustrated as peripherally positioned by the temple portions 605, other implementations can peripherally position the illuminators 410 and/or imaging arrays 415 on structural features of the rim portion 603. Further, as described with reference to FIG. 4, some embodiments do not include all of the illustrated components, and some embodiments include additional components that are not illustrated. For example, some embodiments of the wearable system 600 are implemented without integrated displays 430; instead the rim portion 603 is configured to leave an empty space in front of one or both eyes, or to support a transparent or translucent material (e.g., a piece of class, plexiglass, plastic, etc.; a prescription or other lens; etc.) in front of one or both eyes. As another example, some embodiments of the wearable system 600 do not include scene sensors 440, interface subsystems 435, and/or other components.

In the illustrated embodiment, the right temple piece 605-R is configured to position at least the right-eye imaging array 415-R at a side periphery of the right eye, proximate to the user's right temple; and the left temple piece 605-L is configured to position at least the left-eye imaging array 415-L at a side periphery of the left eye, proximate to the user's left temple. The wearable structure is further configured to position the right-eye illuminator 410-R and the left-eye illuminator 410-L in the periphery of the respective eyes. For example, as illustrated, the right temple piece 605-R can position the right-eye illuminator 410-R at the side periphery of the right eye along with the right-eye imaging array 415-R, and the left temple piece 605-L can position the left-eye illuminator 410-L at the side periphery of the left eye along with the left-eye imaging array 415-L.

With such an arrangement of the imaging arrays 415 (e.g., and the illuminators 410), each nose portion 607 is in view of a respective one of the imaging arrays 415. The nose portions 607 can include various features. One feature is that the nose portions 607 can effectively regulate the x-dimension by holding the wearable system 600 substantially centered on the user's face. Human faces typically have predictable dimensions, at least within a certain degree of error tolerance. For example, at least the eye regions of human faces are typically substantially symmetric and faces within certain size ranges tend to have similar eye dimensions (e.g., the distance between the temples and pupil centers tend to be relatively consistent between users with similarly sized faces). Wearing the wearable system 600 with the nose portions 607 straddling the user's nose tends to place each imaging array 415 substantially the same distance from the eyeball center on its respective side without requiring calibration. As such, in some embodiments, the wearable system 600 structures have a particular, known size for a particular range of user face sizes (e.g., or multiple selectable sizes for multiple corresponding ranges of face sizes), and some such embodiments can estimate at least an x-component of the 3D origin point for each eye (e.g., the horizontal position) based on the known dimensions of the wearable system 600 and accordingly assumed dimensions of the user's face.

In some cases, the size of the wearable system 600 is adjustable (e.g., the structure has built-in adjustable features, the structure can be slightly bent for improved fit, etc.). In some such cases, the nose portions 607 provide another feature: each nose portion 607 can be used to derive an x-reference. Some implementations of the control processor 420 detect a feature of the nose portion 607 from which a distance can be computed. For example, one or both nose portions 607 includes a structural or aesthetic element (e.g., a corner point, a photogrammetry target, a cross, a reflective point, a design, etc.) that is identifiable by the control processor 420 and known by the control processor 420 to have a pre-calibrated size. The control processor 420 detects and measures the element in the obtained imagery and can compare the detected size with the known size to compute a distance between the imaging array 415 and the nose portion 607. Some implementations assume, as above, that the nose portions 607 generally center the frame on the face and that the face is generally symmetrical. As such, computing the distance between the imaging array 415 imaging array 415 and the nose portion 607 on one side can effectively provide information for both sides. Other implementations obtain imagery and perform distance computations for both eyes and do not rely on assumptions of frame placement, symmetry, etc.

Such estimation of the position of the frame relative to the user's eyes can be performed without any user-specific calibration. However, additional features can be achieved with user-specific calibration. One feature is that, rather than relying on presence of a known structural or aesthetic element for distance computation, embodiments can detect and measure user features (e.g., freckles, or other anatomical elements) as bases for computing distance from the imaging array 415 to the eye on one or both sides. Another feature of user calibration is to address cases in which the user's face is not symmetrical, and/or where the frame is not centered on the face. In such cases, the user can be prompted (explicitly or implicitly) to look in a particular direction (e.g., straight ahead), and differences in imagery between the two sides indicates a difference in distance that can be normalized, compensated for, calibrated out, etc. For example, if the user is looking straight ahead and each imaging array 415 is the same distance from its respective eye, it can be assumed that the right and left pupil sizes, shapes, and/or positions will appear substantially identical in captured imagery. Thus, any delta between the right and left pupil images deterministically corresponds to a difference in physical distance between the imaging arrays 415 and the two eyes.

Another feature of the nose portions 607 is to reduce crosstalk from undesired illumination. In the illustrated configuration, the right-eye imaging array 415-R is pointing in the direction of the left eye and the left-eye illuminator 410-L, such that it would tend to pick up scattered illumination from the left side; and the left-eye imaging array 415-L is pointing in the direction of the right eye and the right-eye illuminator 410-R, such that it would tend to pick up scattered illumination from the right side. Implementations of the nose portions 607 are designed to maintain some optical isolation during concurrent imaging of the two eyes. Some embodiments use other techniques to help reduce such crosstalk. For example, each illuminator 410 can project illumination with a particular polarization, frequency, timing, etc.; and each imaging array 415 can be configured (e.g., with filters, shutters, etc.) to receive illumination from its own respective illuminator 410.

Another feature of the nose portions 607 is to increase reflection of desired illumination. In the illustrated configuration, the right nose portion 607-R can be configured to help reflect illumination from the right-eye illuminator 410-R toward the right-eye imaging array 415-R, and the left nose portion 607-L can be used to help reflect illumination from the left-eye illuminator 410-L toward the left-eye imaging array 415-L. Such additional reflection can help improve the responsiveness of the imaging arrays 415, such as by providing greater imaging contrast, better performance in bright ambient light environments, etc.

Figure 7:
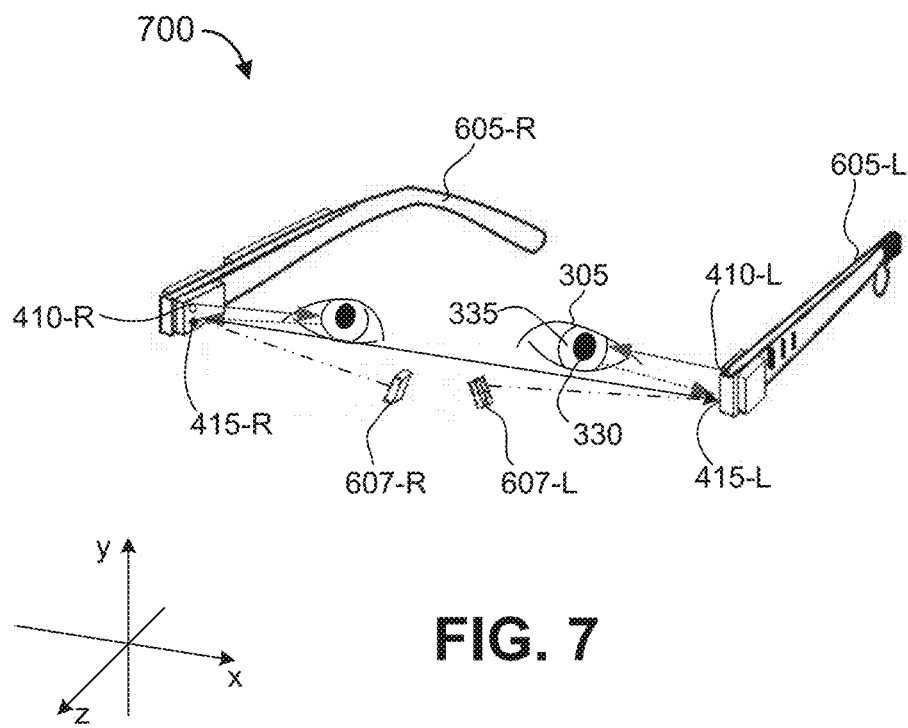
FIG. 7 shows a sightline tracking environment that includes a portion of the wearable system of FIG. 6 in context of a user's eyes.

FIG. 7 shows a sightline tracking environment 700 that includes a portion of the wearable system 600 of FIG. 6 in context of a user's eyes. As in FIG. 6, the right temple piece 605-R is configured to position the right-eye imaging array 415-R and the right-eye illuminator 410-R at a side periphery of the right eye (proximate to the user's right temple), and the left temple piece 605-L is configured to position the left-eye imaging array 415-L and the left-eye illuminator 410-L at a side periphery of the left eye (proximate to the user's left temple). From this perspective, each imaging array 415 obtains imagery of a respective one of the user's eyes from its respective temporal periphery, i.e., a side view of each eye. In some implementations, as shown, each imaging array 415 is placed low on the respective temple portion 605 (or in a comparable position on the rim portion 603, or other structure) to facilitate imaging of the entire pupil 330.

Embodiments of the control processor 420 process the imagery of each side view (of each eye) to compute a 3D origin point for the eye and an angular measurement of the direction in which the pupil is looking. To obtain the 3D origin point, embodiments of the control processor 420 process the side-view image to detect the outer surface of the cornea and to find a vertex of curvature of the outer corneal surface. The y- and z-coordinates of the vertex define the y- and z-coordinates of the 3D origin point. As described above, the x-coordinate of the 3D origin point can be obtained in several ways. In some embodiments, the vertex is used by the control processor 420 as the 3D origin point for that eye. In other embodiments, the detected corneal surface curvature (e.g., and the vertex) is used to estimate an eyeball center location, which is used as the 3D origin point for that eye.

Figure 8:
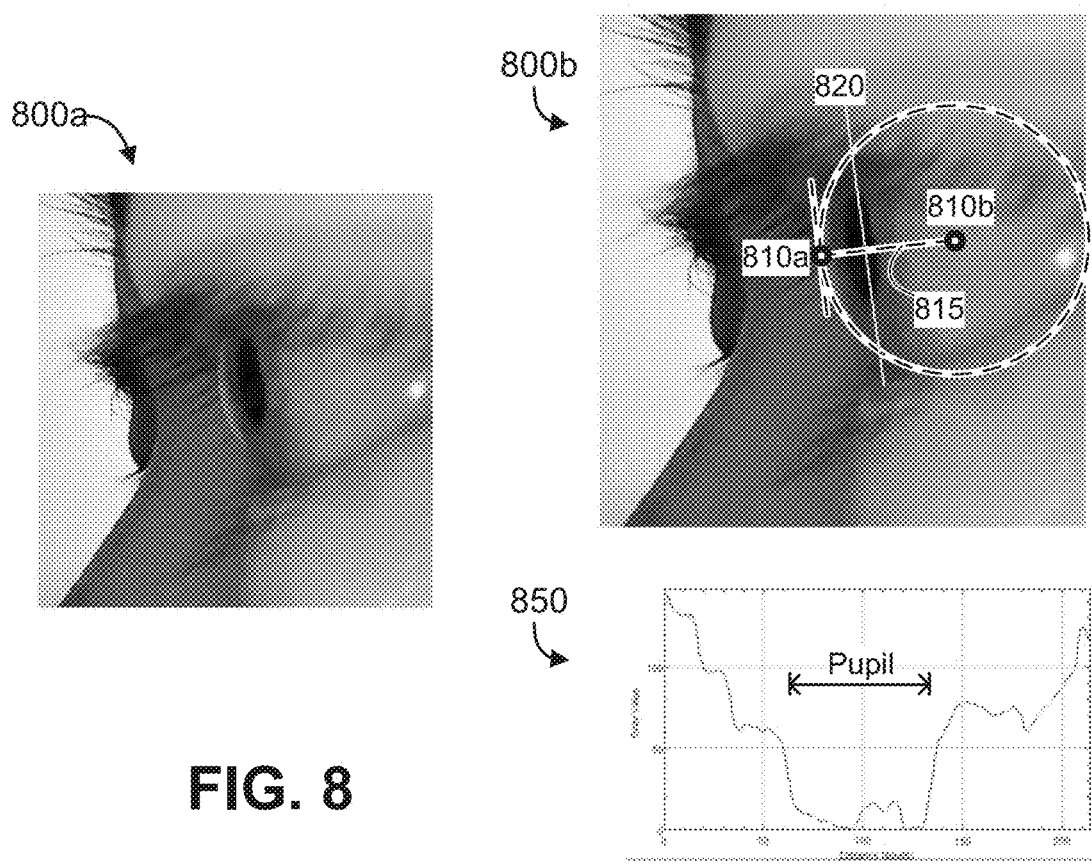
FIG. 8 shows illustrative side-view images of a left eye and related data.

For example, FIG. 8 shows illustrative side view images 800 of a left eye, and related data. The image 800*a* is for illustrative purposes only. If the image 800*a* were taken by the left-eye imaging array 415-L under illumination by the left-eye illuminator 410-L of FIG. 6 or 7, the image 800*a* would also show features of the wearable structure 405 (e.g., the left nose portion 607-L, part of the rim portion 603, part of the right temple portion 605-R) and/or any sightline tracking components in the field of view of the left-eye imaging array 415-L. From the perspective of the left-eye imaging array 415-L, the curvature of the surface of the left cornea 335 and the left pupil 330 can clearly be seen.

Embodiments of the control processor 420 use image processing techniques to detect and compute various features from the imagery. For example, image 800*b* is the same as image 800*a*, except with several computed features graphically represented as overlays on the image 800*b*. For example, the control processor 420 can process the image 800a to detect the corneal surface curvature, from which the control processor 420 can compute (e.g., estimate) a vertex point 810a of the curvature, a radius 815 of the curvature, a center point 810b of the curvature, etc. As described herein, the control processor 420 can determine the 3D origin point of the left eye 305 as the vertex point 810a, the center point 810b, or some other point computable therefrom. For example, the center point 810b can be considered as an approximate center of the eyeball, or a more accurate eyeball center point can be computed based on known geometric relationships in a human eyeball (e.g., as described in FIG. 3), as reference to the curvature, vertex point 810a, center point 810b, and/or other detectable features.

Embodiments of the control processor 420 can also detect the pupil 330. As described above, the manner of illumination, filtering, and/or other techniques can result in the pupil 330 having high contrast relative to surrounding tissues. For example, a plot profile 850 shows the grey values of a line of pixels 820 in image 800b. In the plot profile 850, the location of the pupil 330 manifests as a conspicuously dark region of the pixel values. Such pupil 330 detection can facilitate several features. One feature is that tracking of the center of the pupil 330 from the side can indicate the y-component of a computed sightline vector (i.e., the center of the pupil 330 when viewed from the side will change when the user's sightline shifts upward or downward). Another feature is that tracking the side-view pupil 330 center (i.e., the vertical center) from both sides can facilitate auto-calibration of the sightline tracking. For example, if the wearable structure 405 is being worn in a crooked manner on the user's face (or if separable substructures of the wearable structure 405 are not positioned precisely at the same vertical position on the user's face), the imaging array 415 on one side may be positioned higher or lower than the imaging array 415 on the other side; and the y-values will not be in a common vertical reference frame across the two eyes. In some such cases, the vertical pupil 330 centers on the two sides can be used to compare the vertical reference frames.

The sightline tracking described herein involves determination of a 3D origin point and angular coordinate measurements for one or both eyes. Those two properties are used to compute a sightline vector that begins at the 3D origin point and points in a direction determined by the angular coordinate measurements. Embodiments, such as those described in FIGS. 6 and 7 can determine a 3D origin point based on side-view imagery of one or both eyes by detecting at least a corneal surface curvature and vertex point. Such configurations can also use side-view imagery to compute the angular coordinate measurements. The sightline tracking is ultimately based on the angular coordinate measurements. In some configurations and applications, however, the 3D origin point is critical to ensuring accuracy of the angular coordinate measurement.

Figure 14:
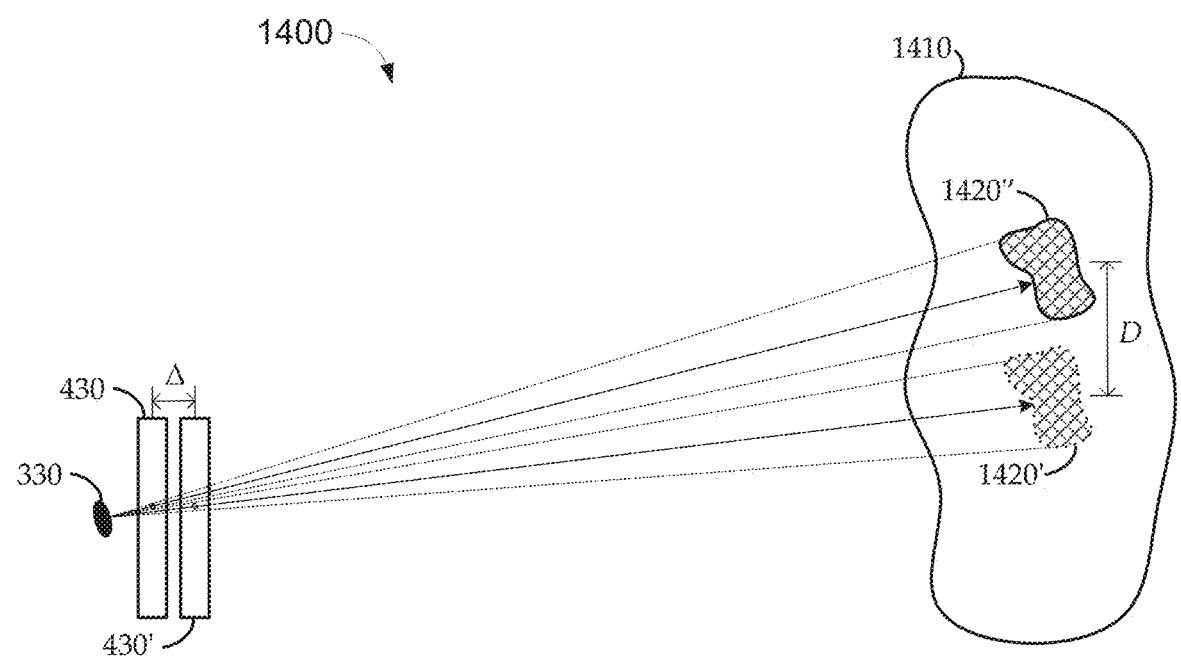
FIG. 14 shows an example augmented reality (AR) environment.

For the sake of illustration, FIG. 14 shows an example augmented reality (AR) environment 1400. A user is looking at a real-world object 1410 several meters away, and the wearable system may be attempting to project an overlaid virtual object 1420 onto the real-world object 1410 via a display 430 that is only 10-15 millimeters from each eye (the figure is not to scale). The actual position of the display relative to the pupil 330 of the eye is shown as display 430, and a computed position of the display relative to a computed 3D origin point is shown as display 430'. Based on the computed display position and the angular coordinate measurements, the virtual object 1420 is displayed with the intention of being projected at the location represented by projected virtual object 1420'. If the computed position of the display (i.e., based on the computed 3D origin point) were accurate, the projected virtual object 1420' would appear to the user as being in the correct real-world location. However, a small error in the computed 3D origin point results in the computed position of display 430' being offset by some small distance (A). As a result, the displayed virtual object 1420 appears as projected virtual object 1420", which appears to the user as being offset from its correct real-world position by a relatively large distance (D). Because the eye is so close to the display 430, even a small A can result in a large D. Thus, in configurations, such as that of FIG. 6, some applications may rely on accurate computation of both the 3D origin point and angular coordinate measurements to ensure accurate sightline tracking.

Figure 9:
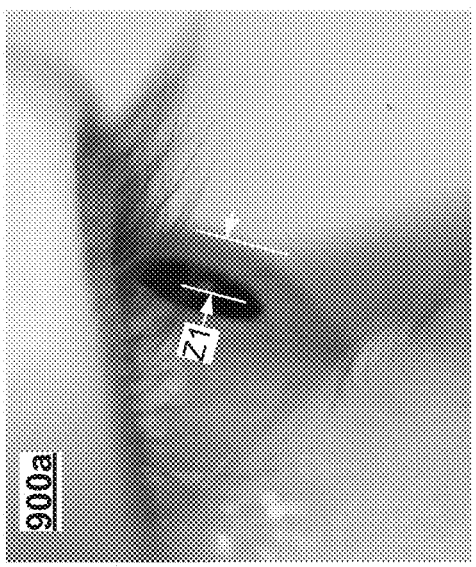
FIG. 9 shows a corneal-vertex-to-pupil-center distance measurement approach for computing angular coordinate measurements for sightline tracking, according to some embodiments described herein.
Figure 9:
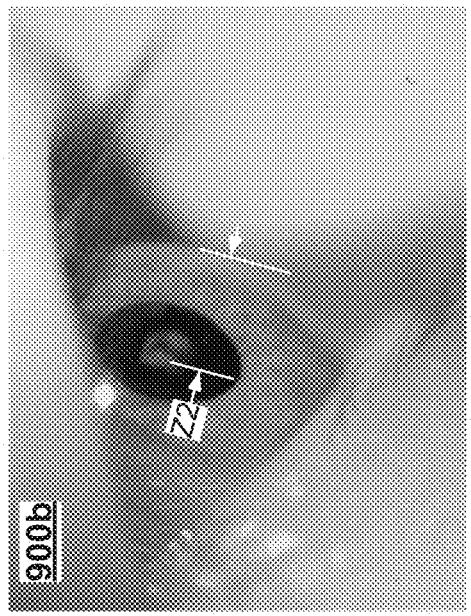
Figure 10:
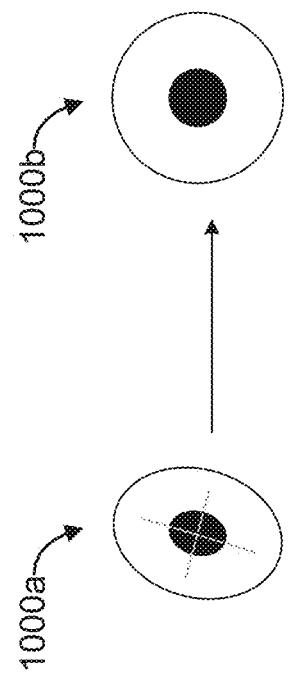
FIG. 10 shows a pupil roundness measurement approach for computing angular coordinate measurements for sightline tracking, according to some embodiments described herein.

FIGS. 9 and 10 show two approaches for computing angular coordinate measurements. FIG. 9 shows a corneal-vertex-to-pupil-center distance measurement approach for computing angular coordinate measurements for sightline tracking, according to some embodiments described herein. The approach assumes that imagery is being capture from a side-view, such as by imaging arrays 415 located at temporal peripheries of a user's eyes. FIG. 9 shows a first example side-view image 900a of a user's right eye in which the user is looking straight ahead, and a second example side-view image 900b of the user's right eye in which the user is looking to the right. As described above, embodiments of the control processor 420 can detect the curvature of the corneal surface and a corresponding vertex point and can also detect the pupil. Embodiments of the control processor 420 can measure and track a distance between the vertex point and a center of the pupil. That corneal-vertex-to-pupil-center distance changes based on the side-to-side viewing angle of the eye. Because the eyeball rotates to the side, the change in the pupil's center manifests as a deterministic change in at least its z-position. For example, as illustrated, the corneal-vertex-to-pupil-center distance (Z1) in the first image 900a (looking forward) is appreciably smaller than the corneal-vertex-to-pupil-center distance (Z2) in the second image 900b (looking to the right).

FIG. 10 shows a pupil roundness measurement approach for computing angular coordinate measurements for sightline tracking, according to some embodiments described herein. The approach assumes that imagery is being capture from a side-view, such as by imaging arrays 415 located at temporal peripheries of a user's eyes. FIG. 10 shows a first example of a pupil shape 1000a when detected from a side-view image of a user's eye looking straight ahead, and a second example of a pupil shape 1000b when detected from a side-view image of a user's eye looking to the right. It can be seen that the example pupil shapes 1000a and 1000b correspond to those seen in images 900a and 900b, respectively. When the pupil is pointed directly at the imaging array 415, the pupil is substantially the shape of a circle; and there is a deterministic change in the roundness of the pupil as the user looks away from the imaging array 415. For example, the second pupil shape 1000b is substantially circular (looking to the right), and the first pupil shape 1000a has appreciably less roundness (looking straight ahead).

Some embodiments perform one or both of the approaches described in FIGS. 9 and 10 using imagery from a single eye. Other embodiments perform the above approaches using imaging data from both eyes. As applied to the approach of FIG. 9, when the user looks to either side, even slightly, there will be a change in the corneal-vertex-to-pupil-center distance for both eyes. Comparing that change can provide a more accurate representation of a change in sightline. Due to the spherical shape of the eyeball, the change in corneal-vertex-to-pupil-center distance is not linear, and the change when the eye moves in one direction may not be the same as the change when the eye looks in the other direction. For example, if only the right eye is imaged, there will be a relatively large change in corneal-vertex-to-pupil-center distance when the user looks to the right, and a relatively small (or even potentially undetectable) difference in corneal-vertex-to-pupil-center distance when the user looks to the left. However, using imagery from both eyes, a relatively large change will be detectable in imagery from at least one or the other eye, regardless of the direction to which the sightline shifts. A similar effect can be seen with respect to the approach of FIG. 10. When the user looks to either side, even slightly, there will be a change pupil roundness for both eyes; and comparing that change can provide a more accurate representation of a change in sightline. For example, if only the right eye is imaged, there will be a relatively large change in pupil roundness when the user looks to the right, and a relatively small (or even potentially undetectable) difference in pupil roundness when the user looks to the left. However, using imagery from both eyes, a relatively large change will be detectable in imagery from at least one or the other eye, regardless of the direction to which the sightline shifts.

Figure 11:
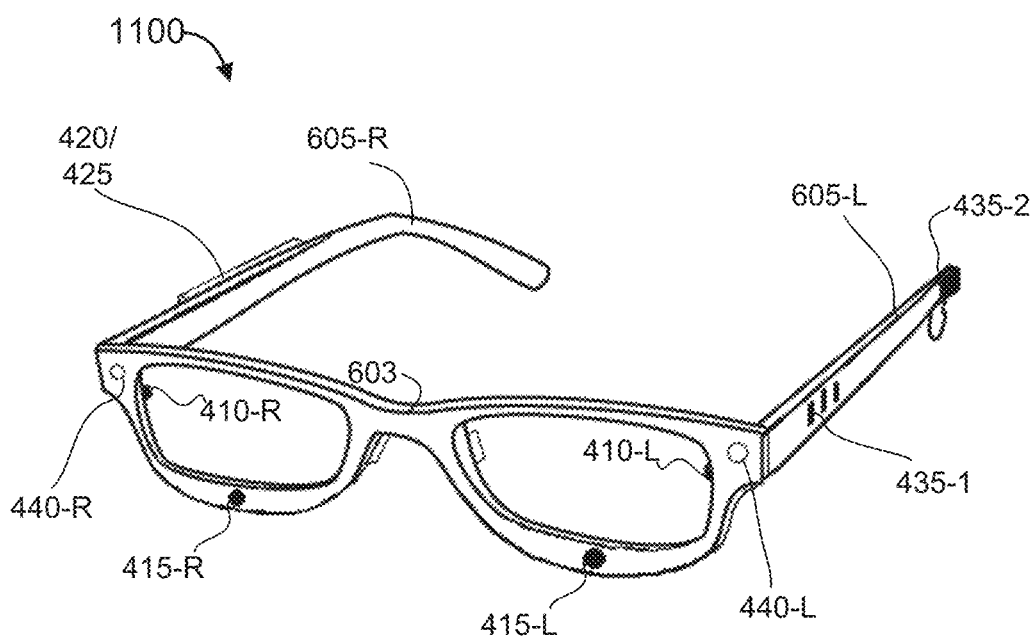
FIG. 11 shows an illustrative wearable system, according to embodiments described herein, in which one or both of the user's eyes are imaged from the bottom periphery.

FIGS. 6-10 generally describe a set of embodiments of the wearable system 400 of FIG. 4 in which a user's eyes are imaged from the side peripheries. FIG. 11 shows an illustrative wearable system 1100, according to a second set of embodiments, in which one or both of the user's eyes are imaged from the bottom periphery. The wearable system 1100 can be an implementation of the wearable system 400 of FIG. 4. The wearable system 1100 can include some or all of the same components as those of FIG. 4 and/or FIG. 6, located in the same or different locations; the same reference designators are used, accordingly. Unlike in FIG. 6, where each imaging array 415 is disposed to a temporal periphery of a respective eye (e.g., structurally integrated with one of the temple portions 605 of the wearable structure 405), each imaging array 415 in wearable system 1100 is disposed at a bottom periphery of a respective eye (e.g., structurally integrated with the rim portion 603 of the wearable structure 405).

In the illustrated embodiment, the right-eye imaging array 415-R is positioned by the rim portion 603 at a bottom periphery of the right eye, proximate to the top of the user's right cheek; and the left-eye imaging array 415-L is positioned by the rim portion 603 at a bottom periphery of the left eye, proximate to the top of the user's left cheek. In some embodiments, the right-eye illuminator 410-R and the left-eye illuminator 410-L are positioned in the temporal peripheries of the respective eyes, such as in FIG. 6 (and as illustrated in FIG. 11). In other embodiments, the right-eye illuminator 410-R and/or the left-eye illuminator 410-L are positioned in one or more additional or alternative locations around the periphery of the eyes.

Figure 12:
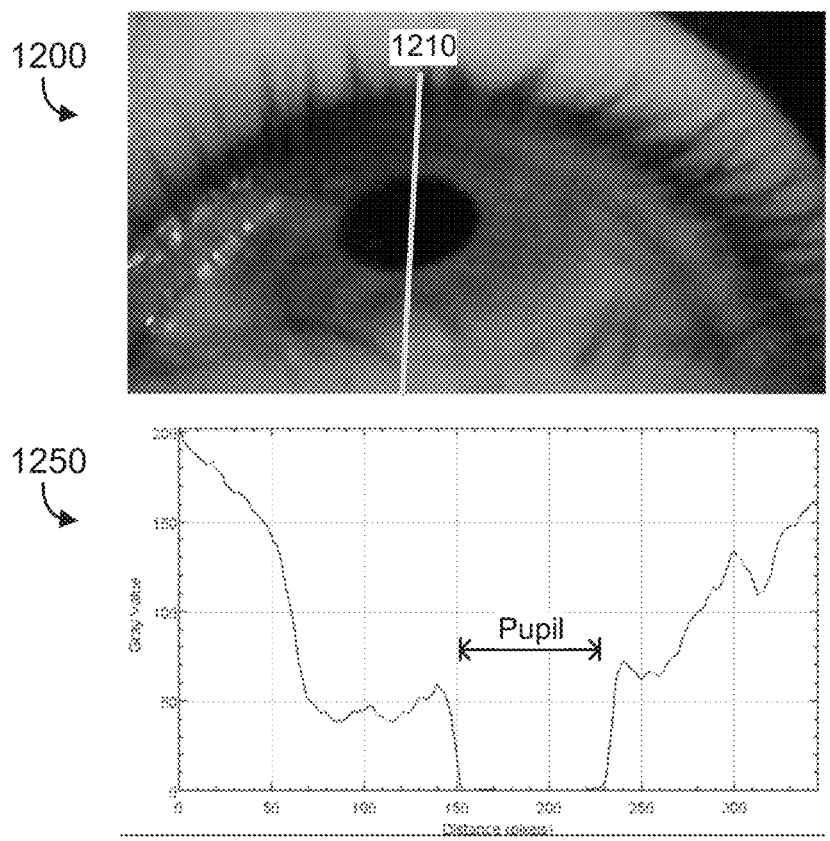
FIG. 12 shows an example of a bottom-view image of a user's eye, such as would be captured by one of the imaging arrays of the wearable system of FIG. 11.

With such an arrangement of the imaging arrays 415 (e.g., and the illuminators 410), the imaging array 415 are looking up at the eyes. From this perspective, it may not be possible to detect the corneal curvature of the eyes. However, the pupil of each eye can be easily detected. FIG. 12 shows an example of a bottom-view image 1200 of a user's eye, such as would be captured by one of the imaging arrays 415 of the wearable system 1100 of FIG. 11. As described above, the manner of illumination, filtering, and/or other techniques can result in the pupil 330 having high contrast relative to surrounding tissues. For example, a plot profile 1250 shows the grey values of a line of pixels 1210 in image 1200. In the plot profile 1250, the location of the pupil manifests as a conspicuously dark region of the pixel values. Generating similar plot profiles across the image can yield a clear picture of at least a two-dimensional (x-y) representation of the pupil.

In some embodiments, such pupil detection can be used by the control processor 420 to compute the 3D origin point of one or both eyes. For example, when the system first turns on, an image is projected straight ahead of the user, or the user is prompted to look straight ahead. The control processor 420 can detect and measure the pupil center, which it can establish as the x-components and the y-component of the 3D pupil center location relative to the sensor location. The z-component can be assumed as '0,' or any other suitable quantity. For example, during sightline tracking, the user is typically looking at objects tens of centimeters away from the user's face, or even much farther away. Because there is likely only a few millimeters of z-distance between the imaging array 415 in wearable system 1100 and the user's pupil, such a distance may be well within any z-directional error tolerance of the wearable system 1100.

In some embodiments, the calibration and measurement of the 3D origin point uses imagery from both eyes. If the wearable structure 405 is centered on the user's face, the user's face is symmetric, and the user is looking straight ahead, the horizontal (x) position of each pupil center should be substantially identical in its corresponding right-eye or left-eye imagery. For example, if each imaging array 415 were positioned perfectly below its respective pupil center while the user is looking straight ahead, the pupil center would appear at horizontally centered in both the right-eye and left-eye imagery. Any delta between the x-positions of the right and left pupil centers, then, can indicate that the wearable structure 405 is not perfectly centered on the user's face, that the user's face is not symmetrical, etc. In any case, by obtaining an x-position measurement while the user is looking ahead, any such offset, delta, or the like can be calibrated out as part of computing the 3D origin point.

After computing the 3D origin point of one or both eyes, the angular coordinate measurement can be computed by the control processor 420 by tracking a change in the location of the center of the pupil. For example, as the user looks to either side, the x-position of the pupil center will change in a deterministic manner; and as the user looks up of down, the y-position of the pupil center will change in a deterministic manner.

The bottom-up imaging configuration of wearable system 1100 provides trade-offs in relation to side-in imaging configuration of wearable system 600. For example, at least because of the substantially constant radius of corneal curvature, wearable system 600 can provide accurate sightline tracking (e.g., accurate computation of a 3D origin point, etc.) without any user-specific calibration; while computation of the 3D origin point in wearable system 1100 can rely on obtaining imagery with the user's eyes in a known calibration position (e.g., looking straight ahead). On the other hand, wearable system 1100 can provide appreciably simpler angular coordinate tracking as compared to that of wearable system 600. Further, while some implementations of wearable system 600 rely on imaging information from both eyes for robust angular coordinate tracking, such angular coordinate tracking can be reliably performed with single-eye imagery using wearable system 1100.

Figure 13:
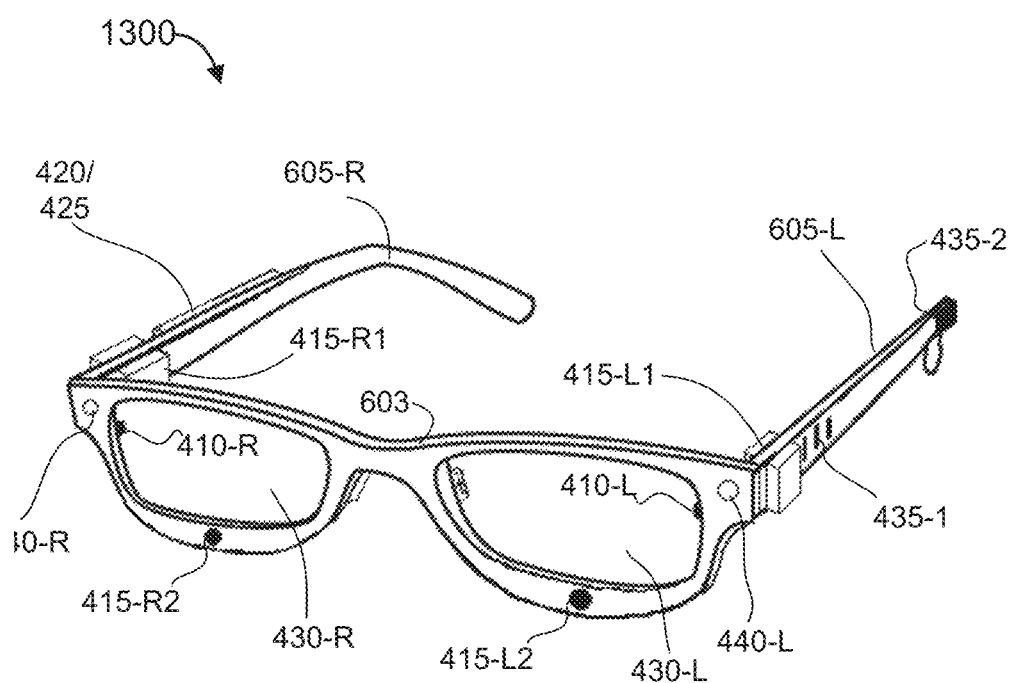
FIG. 13 shows an illustrative wearable system, according to a third set of embodiments, in which one or both of the user's eyes are imaged both from the side periphery and from the bottom periphery.

FIG. 13 shows an illustrative wearable system 1300, according to a third set of embodiments, in which one both of the user's eyes are imaged both from the side periphery and from the bottom periphery. The wearable system 1300 can be an implementation of the wearable system 400 of FIG. 4. The wearable system 1300 is effectively a combination of wearable system 1100 and wearable system 600 and can include some or all of the same components, located in the same or different locations; the same reference designators are used, accordingly. As described above, each of wearable system 600 and wearable system 1100 have certain features and limitations. The hybrid approach of wearable system 1300 combines the features of the two imaging approaches to overcome the limitations. For example, the side-view imaging provided by wearable system 600 can be used for calibration and periodic verification, while the bottom-view imaging provided by wearable system 1100 can be used for efficient dynamic tracking of changes in angular coordinate measurements. Some implementations perform side-view imaging and bottom-view imaging concurrently. Other implementations perform side-view imaging and bottom-view imaging in a time-division manner, such as with imaging and/or illumination time slots assigned to the different imaging approaches.

Figure 15:
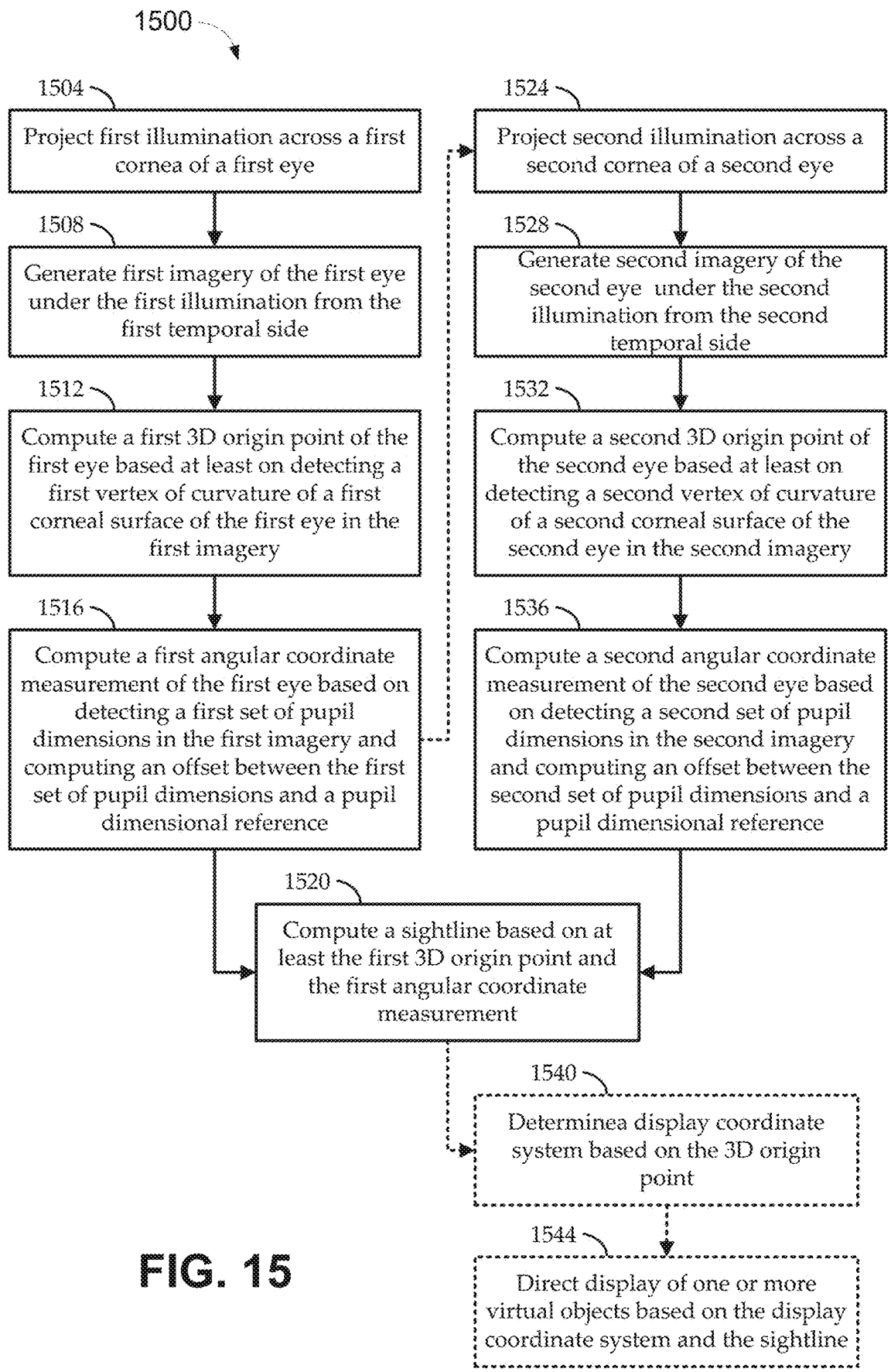
FIG. 15 shows a flow diagram of a method for optical sightline tracking by a wearable system, according to various embodiments described herein.

FIG. 15 shows a flow diagram of a method 1500 for optical sightline tracking by a wearable system, according to various embodiments described herein. Embodiments of the method 1500 begin at stage 1504 by projecting first illumination, by a first illuminator of a wearable structure located at a first temporal side of a first eye of a user wearing the wearable structure, the first illumination projected across a first cornea of the first eye. At stage 1508, embodiments can generate first imagery of the first eye, under the first illumination, by a first imaging array of the wearable structure located at the first temporal side. In some embodiments, the first illuminator projects the illumination in a non-visible, eye-safe frequency band, and the first imaging array has receiving optics including a bandpass filter transmissive to the non-visible, eye-safe frequency band.

At stage 1512, embodiments can compute (e.g., by a control processor of the wearable structure) a first three-dimensional (3D) origin point of the first eye based at least on detecting a first vertex of curvature of a first corneal surface of the first eye in the first imagery. At stage 1516, embodiments can compute (e.g., by the control processor) a first angular coordinate measurement of the first eye based on detecting a first set of pupil dimensions in the first imagery and computing an offset between the first set of pupil dimensions and a pupil dimensional reference. In some embodiments, the computing the first angular coordinate measurement at stage 1516 includes detecting a first pupil center location in the first imagery and computing the offset as between the first pupil center location and the first vertex of curvature. In some embodiments, the computing the first angular coordinate measurement at stage 1516 includes detecting a roundness of the first pupil and computing the offset as between the roundness of the first pupil roundness and a true circular reference. At stage 1520, embodiments can compute (e.g., by the control processor) a sightline based on the first 3D origin point and the first angular coordinate measurement.

In some embodiments, sequentially or concurrently, the method further operates on the user's second eye. For example, at stage 1524, embodiments project second illumination, by a second illuminator of the wearable structure located at a second temporal side of a second eye of the user, the second illumination projected across a second cornea of the second eye. At stage 1528, such embodiments generate second imagery of the second eye, under the second illumination, by a second imaging array of the wearable structure located at the second temporal side. At stage 1532, such embodiments compute (e.g., by the control processor) a second 3D origin point of the second eye based at least on detecting a second vertex of curvature of a second corneal surface of the second eye in the second imagery. At stage 1536, such embodiments compute (e.g., by the control processor) a second angular coordinate measurement of the second eye based on detecting a second set of pupil dimensions in the second imagery and computing an offset between the second set of pupil dimensions and a second pupil dimensional reference. In such embodiments, the computing the sightline in stage 1520 can be further based on the second 3D origin point and the second angular coordinate measurement.

Some embodiments further use the sightline to determine a manner of displaying virtual objects to the user, such as by projecting the objects into an augmented or virtual environment. Dor example, at stage 1540, embodiments can determine (e.g., by the control processor) a display coordinate system based on the 3D origin point. At stage 1544, such embodiments can direct display (e.g., by the control processor) of one or more virtual objects on a display based on the display coordinate system and the sightline. In some such embodiments, a scene sensor, or the like (e.g., integrated with the wearable structure) can detect one or more features of a real-world environment in a real-world coordinate system, and directing display in stage 1544 involves computing a mapping between the display coordinate system to the real-world coordinate system and directing display of the virtual objects as projected into the real-world environment based on the mapping and the sightline.

While this disclosure contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

A recitation of "a", "an" or "the" is intended to mean "one or more" unless specifically indicated to the contrary. Ranges may be expressed herein as from "about" one specified value, and/or to "about" another specified value. The term "about" is used herein to mean approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. When such a range is expressed, another embodiment includes from the one specific value and/or to the other specified value. Similarly, when values are expressed as approximations, by use of the antecedent "about," it will be understood that the specified value forms another embodiment. It will be further understood that the endpoints of each of the ranges are included with the range.

All patents, patent applications, publications, and descriptions mentioned here are incorporated by reference in their entirety for all purposes. None is admitted to be prior art.

What is claimed is:

1. A system for optical sightline tracking, the system comprising:
   a wearable structure configured to be worn on a user's head;
   a first illuminator integrated with the wearable structure at a first temporal side of a first eye of the user to project illumination across a first cornea of the first eye;
   a first imaging array integrated with the wearable structure at the first temporal side to generate first imagery of the first eye; and
   a control processor to:
      compute a first three-dimensional (3D) origin point of the first eye based at least on detecting a first vertex of curvature of a first corneal surface of the first eye in the first imagery;
      compute a first angular coordinate measurement of the first eye based on detecting a first set of pupil dimensions in the first imagery and computing an offset between the first set of pupil dimensions and a pupil dimensional reference; and
      compute a sightline based on the first 3D origin point and the first angular coordinate measurement.

2. The system of claim 1, wherein the control processor is to compute the first angular coordinate measurement of the first eye by:
   detecting a first pupil center location in the first imagery and computing the offset as between the first pupil center location and the first vertex of curvature.

3. The system of claim 1, wherein the control processor is to compute the first angular coordinate measurement of the first eye by:
   detecting a roundness of the first pupil and computing the offset as between the roundness of the first pupil roundness and a true circular reference.

4. The system of claim 1, wherein the control processor is to compute the first 3D origin point to include a first y-value and a first z-value as the first vertex of curvature.

5. The system of claim 1, wherein the control processor is to compute the first 3D origin point to include a first y-value and a first z-value corresponding to an eyeball center of the first eye based on the first vertex of curvature and a radius of curvature of the first corneal surface estimated from the first imagery.

6. The system of claim 1, further comprising:
   a nose portion integrated with the wearable structure and configured to reflect illumination projected from the first illuminator back to the first imaging array.

7. The system of claim 1, further comprising:
   a nose portion integrated with the wearable structure and having a measurable feature thereon, the feature being recognizable to the control processor as having a pre-calibrated size,
   wherein the control processor is to compute the first 3D origin point to include a first x-value by measuring a detected size of the feature in the first imagery and computing an x-distance from the first imaging array to the feature based on a difference between the detected size and the pre-calibrated size, and determining the first x-value based on the x-distance.

8. The system of claim 1, further comprising:
   a second illuminator integrated with the wearable structure at a second temporal side of a second eye of the user to project illumination across a second cornea of the second eye, the first and second temporal sides being on opposite sides of the user's head; and
   a second imaging array integrated with the wearable structure at the second temporal side to generate second imagery of the second eye,
   wherein the control processor is further to:
      compute a second 3D origin point of the second eye based at least on detecting a second vertex of curvature of a second corneal surface of the second eye in the second imagery; and
      compute a second angular coordinate measurement of the second eye based on detecting a second pupil center location and/or a second pupil roundness in the second imagery, and
   wherein the control processor is to compute the sightline based further on the second 3D origin point and the second angular coordinate measurement.

9. The system of claim 8, wherein the control processor is to compute the first 3D origin point to include a first x-value computed based on a center-point between the first imaging array and the second imaging array.

10. The system of claim 8, further comprising:
    a nose portion integrated with the wearable structure and positioned so that the first imaging array and the first illuminator are to a first side of the nose portion, and the second imaging array and the second illuminator are to a second side of the nose portion, the nose portion configured to mitigate optical crosstalk between the first side and the second side.

11. The system of claim 1, wherein the control processor is integrated with the wearable structure.

12. The system of claim 1, further comprising:
    a display integrated with the wearable structure,
    wherein the control processor is further to determine a display coordinate system based on the 3D origin point and to display one or more virtual objects on the display based on the display coordinate system and the sightline.

13. The system of claim 12, further comprising:
    a scene sensor integrated with the wearable structure to detect one or more features of a real-world environment in a real-world coordinate system,
    wherein the control processor is further to compute a mapping between the display coordinate system to the real-world coordinate system and to display at least one of the virtual objects on the display as projected into the real-world environment based on the mapping and the sightline.

14. The system of claim 1, wherein the first illuminator projects the illumination in a non-visible, eye-safe frequency band, and the first imaging array has receiving optics including a bandpass filter transmissive to the non-visible, eye-safe frequency band.

15. The system of claim 1, wherein the wearable structure is integrated with eyeglass frames.

16. A method for optical sightline tracking, the method comprising:
- projecting first illumination, by a first illuminator of a wearable structure located at a first temporal side of a first eye of a user wearing the wearable structure, the first illumination projected across a first cornea of the first eye;
- generating first imagery of the first eye, under the first illumination, by a first imaging array of the wearable structure located at the first temporal side;
- computing, by a control processor of the wearable structure, a first three-dimensional (3D) origin point of the first eye based at least on detecting a first vertex of curvature of a first corneal surface of the first eye in the first imagery;
- computing, by the control processor, a first angular coordinate measurement of the first eye based on detecting a first set of pupil dimensions in the first imagery and computing an offset between the first set of pupil dimensions and a pupil dimensional reference; and
- computing, by the control processor, a sightline based on the first 3D origin point and the first angular coordinate measurement.

17. The method of claim 16, wherein the computing the first angular coordinate measurement of the first eye comprises detecting a first pupil center location in the first imagery and computing the offset as between the first pupil center location and the first vertex of curvature.

18. The method of claim 16, wherein the computing the first angular coordinate measurement of the first eye comprises detecting a roundness of the first pupil and computing the offset as between the roundness of the first pupil roundness and a true circular reference.

19. The method of claim 16, further comprising:
- projecting second illumination, by a second illuminator of the wearable structure located at a second temporal side of a second eye of the user, the second illumination projected across a second cornea of the second eye;
- generating second imagery of the second eye, under the second illumination, by a second imaging array of the wearable structure located at the second temporal side;
- computing, by the control processor, a second 3D origin point of the second eye based at least on detecting a second vertex of curvature of a second corneal surface of the second eye in the second imagery;
- computing, by the control processor, a second angular coordinate measurement of the second eye based on detecting a second set of pupil dimensions in the second imagery and computing an offset between the second set of pupil dimensions and a second pupil dimensional reference; and
- computing, by the control processor, the sightline further based on the second 3D origin point and the second angular coordinate measurement.

20. The method of claim 16, further comprising:
- determining, by the control processor, a display coordinate system based on the 3D origin point; and
- directing display, by the control processor, of one or more virtual objects on a display based on the display coordinate system and the sightline.

* * * * *